United States Patent
Herink

[15] 3,661,514
[45] May 9, 1972

[54] PRODUCTION OF ALKALI-METAL POLYPHOSPHATES BY SPRAY DRYING

[72] Inventor: John F. Herink, Pocatello, Idaho
[73] Assignee: FMC Corporation, New York, N.Y.
[22] Filed: July 29, 1970
[21] Appl. No.: 59,159

[52] U.S. Cl..................................23/107, 159/4, 159/48
[51] Int. Cl....................................C01b 25/30, C01b 25/38
[58] Field of Search.................23/106, 106 A, 107; 159/4 A, 159/4 CC, 4 E, 48

[56] References Cited

UNITED STATES PATENTS

| | | | |
|---|---|---|---|
| 2,977,317 | 3/1961 | Rodis et al. | 252/135 |
| 915,303 | 3/1909 | Mecredy et al. | 159/4 |
| 3,474,849 | 10/1969 | Inchaust | 159/4 |

*Primary Examiner*—Oscar R. Vertiz
*Assistant Examiner*—Gregory A. Heller
*Attorney*—Milton Zucker, Frank Ianno, Eugene G. Seems and Pauline Newman

[57] ABSTRACT

Alkali-metal phosphates are produced by spraying liquid containing alkali oxide and $P_2O_5$ values upward into an enclosed drying area against flame or hot gases blowing downward from near the top of the enclosure at a velocity sufficient to force the droplets close to but not past the flame or other source of hot gases and then collecting the product below the level of the spray ports. The product has a higher concentration of granular material than in conventional procedures, greater throughput is obtained and the material is less friable.

4 Claims, 1 Drawing Figure

PATENTED MAY 9 1972
3,661,514
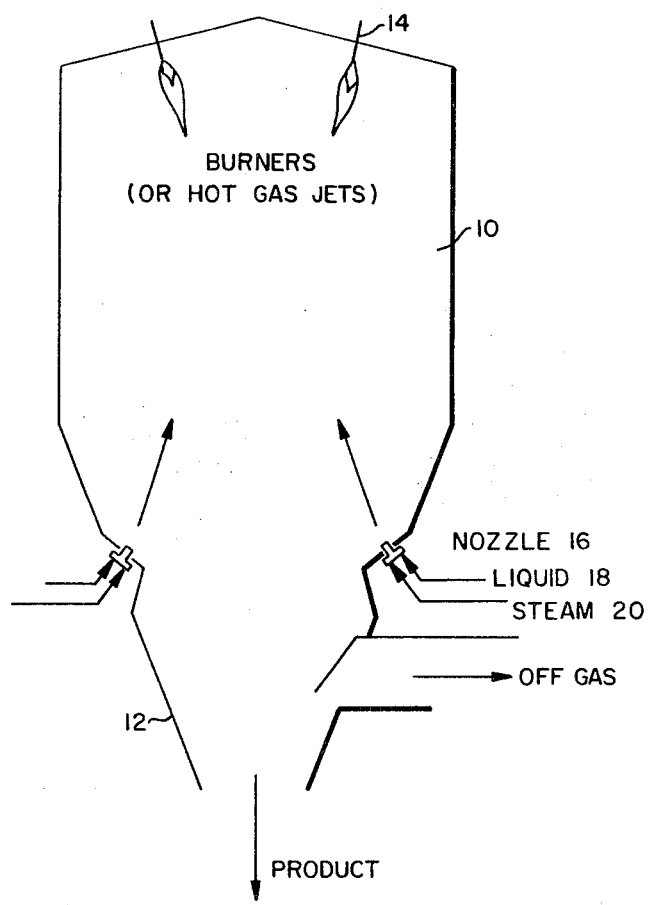
MIXED FLOW SPRAY DRYER
INVENTOR.
JOHN F. HERINK
BY MILTON ZUCKER
PAULINE NEWMAN
EUGENE G. SEEMS

PRODUCTION OF ALKALI-METAL POLYPHOSPHATES BY SPRAY DRYING

BACKGROUND OF THE INVENTION

The alkali-metal phosphates are important bulk industrial chemicals, being widely used, principally as detergent builders. Because they are mixed with other materials for this and many other uses, the particle size distribution is very important; it is desirable that the particle size be fairly well fixed, and that the particles should not be readily friable, so that they maintain their particle size distribution.

A preferred method for making alkali-metal phosphates is to prepare a concentrated solution containing alkali oxide and $P_2O_5$ values in the ratio desired in the final product, and then atomizing the solution with steam, against an open flame or hot gases from a flame, to evaporate the water and produce dry particles. The size range of the particles depends on the size of the droplets produced in atomizing the solution, on the spacing of the burners, on variations of geometry of the spray dry vessel, particularly tower height, on variations in burner size and disposition, and a host of minor considerations. The droplets cannot be exposed for too long a time to flame temperatures, or shell bursting of the particles, which dry from the surface inward, would result.

In the spray drying method as originally developed (see Rodes et al., U.S. Pat. No. 2,898,189 issued Aug. 4, 1959, and U.S. Pat. No. 3,023,083 issued Feb. 27, 1962), the solution was sprayed out of a nozzle surrounded by a ring of burners, and the droplets passed through the flame and then concurrently downward with the stream of combustion gases. This produced dry material efficiently, but tended to popcorn the particles excessively, producing readily friable material. The use of multiple nozzles and multiple flames reduced the popcorning tendencies and markedly improved the tendency to friability of the resultant product. However, the product produced is most variable in size, and tends to contain large percentages of fines. A typical commercial product will have a mean particle size of about 80 mesh (U. S. standard) or about 200 microns, with substantial percentages of fine powder. Because of this, granular alkali-metal phosphates have been largely produced by older methods, such as agglomeration and recalcination, or by calcination of orthophosphates in a rotary calciner.

Particle size can be increased by increasing the size of the sprayed droplets, but they must be small enough so that water is completely evaporated from the product, or the assay of the desired product will not be up to standard, since the residual water will change the molecular constitution of the product. Thus, sodium tripolyphosphate which is not completely dried will contain substantial percentages of orthophosphate as impurity.

Spray dryers in other industries have been operated in different manner than described above — for example, the ceramic industry has used reverse flow to increase residence time. See Belcher et al., Design and Use of Spray Driers — Chemical Engineering, Oct. 14, 1963, page 201. But there has been no suggestion that any improvement in the properties of spray-dried alkali-metal phosphates could be obtained by any radical change in the operation of the spray dryers. There has been a marked need for some method of utilizing spray dryers to produce the more granular grades of alkali-metal phosphates.

STATEMENT OF THE INVENTION

I have found that substantial increases in average particle size can be obtained in spray drying alkali-metal phosphate solutions if the solutions are atomized upwardly near the bottom of a drying zone at a velocity sufficient to push the particles upward so they approach terminal velocity in the area of the sources of the hot drying gases, which are directed downwardly from near the top of the drying zone, and the droplets then fall downwardly with the gases to be collected below the entry point of the solution. Not only is the average particle size increased, but the particles are substantially free of popcorning, and are consequently much less friable than conventionally produced product. In addition, throughput can be increased.

Most preferably, a plurality of entry ports is provided, to give much enhanced increase in average particle size as compared to a single nozzle.

THE DRAWING

In the drawing, the FIGURE is a schematic cross section of an apparatus useful in practicing the invention.

DETAILED DESCRIPTION AND SPECIFIC EXAMPLES OF THE INVENTION

In practicing this invention, aqueous solutions are made containing alkali oxide values and $P_2O_5$ values, in the proportions desired in the finished product, and most preferably in concentrations near saturation, to ensure maximum production with the least heat cost to evaporate water. For example, in making sodium tripolyphosphate, the appropriate 0.6 mol of $P_2O_5$ per mol of $Na_2O$ is absorbed in an aqueous caustic soda or sodium carbonate solution, to produce a substantially saturated solution containing monosodium phosphate and disodium phosphate equivalent to 52 percent sodium tripolyphosphate. This is then pumped into a spray dryer of the general type shown in the drawing, having a cylindrical main section 10 and a frustoconical bottom 12. Heat is provided either from a ring of burners 14 adjacent the top of the dryer or by means of hot gases coming through entry ports in the same positions as the burners. The liquid stream 18, atomized by steam 20, is blown into the dryer through one or more nozzles 16 near the bottom of the dryer. The droplets of atomized solution are impelled upward toward the flames or other source of hot gases reaching terminal velocity in their vicinity; they then fall downward with the off gases, coming out through the bottom 22, while the off gases come out through the off gas vent 24.

In operation of the process, it is essential that the particles be atomized to the desired degree; the finer the atomization, the finer will be the resultant particle size. The amount of atomization is a function of nozzle design, liquid feed rate and steam rate. Obviously, with exposure time in the dryer increased over conventional practice by a factor of about two, larger droplets can be dried.

In a typical large-size spray dryer (25 feet diameter, 25 feet cylinder height, 56 feet over-all height from base), I have operated at liquid feed rates of about 50 to 70 gallons per minute with steam rates of about 1,600 to 2,400 pounds per hour. These rates are typical, but will vary with the size and geometry of the spray equipment, and ordinary operators will have no difficulty in adjusting these rates to fit the geometry of the available equipment.

In the particular spray dryer utilized by me in my experimental work, having the above dimensions, four nozzles operated from the top of the tower, in conventional fashion, produced sodium tripolyphosphate of a mean particle size of about 80 mesh at a steam rate of 2,400 pounds per hour with a feed rate of 60 gallons per minute, while the same steam rate-feed ratio, using a single spray jet operated upward from about the mid point of the cone, produced material with a mean particle size range of about 60 mesh. When the steam rate was doubled in this particular trial, the mean particle size was reduced to 80 mesh. A second series of trials, run with four nozzles pointed upward, and placed just above the bottom of the cylindrical portion of the spray dryer, was then run, with results shown in the following tables.

The product obtained in this test differed sharply from the conventional product, even when produced in the same particle size range. My product showed no popcorning when examined under the microscope; the individual particles were separate, so that the screen size represented the size of the basic particle. In contrast, the product prepared by the prior-art method was agglomerated, so that the basic particle size was substantially smaller than that indicated by screen analyses. Thus, the prior-art product is far more friable than that produced in accordance with this invention.

TABLE 1

[Comparison of mixed-flow test results with typical dryer sizing]

|  | Mixed-flow test [1] | | Prior-art product |
|---|---|---|---|
|  | Average | Range |  |
| Screen size, U.S. No.: | | | |
| +20, percent | 14 | 3–20 | 5 |
| +80, percent | 85 | 67–91 | 62 |
| Granular yield,[2] percent | 78 | 67–87 | 62 |
| Average particle size, U.S. No. | 40 | 65–35 | 65 |

[1] Results of 7 samples.
[2] Granular yield is defined as fraction of +80 mesh material including no more than 7% +20 mesh material.

TABLE 2

[Mixed-flow test effect of steam rate on sizing]

| Steam rate, lbs./hr./nozzle | 300 | 400 | 500 |
|---|---|---|---|
| Feed rate, g.p.m./nozzle | 15 | 16.5 | 15 |
|  | Cumulative percent retained | | |
| Screen size, U.S. No.: | | | |
| +10 | .4 | .6 | 0 |
| +14 | 1.2 | 2.0 | .4 |
| +20 | 15.4 | 13.2 | 3.0 |
| +30 | 35.6 | 34.0 | 11.4 |
| +50 | 72.0 | 72.2 | 41.4 |
| +80 | 88.4 | 90.0 | 67.4 |
| +100 | 91.8 | 93.0 | 74.8 |
| Mean particle size, U.S. No. | 40 | 35 | 65 |

The test runs made which produced the results exemplified in Tables 1 and 2 produced one difficulty and demonstrated the importance of the relationship of particle velocity to geometry. A build-up of material in the top of the dryer accrued, due to excess velocity of the particles, resulting in plugging of the burners and flame-outs. To prevent this, it is essential in practicing this invention to adjust the velocity of the particles — by control of steam and solution feed rates, and nozzle sizing — so that the particles are close to terminal velocity when they near the burners, so that they do not impinge on and plug the burners. This control is readily accomplished for any particular setting. In the spray dryer which was used by me, the desired change as accomplished by moving the inlet ports about midway down the conical section of the spray dryer, at the approximate position shown in the drawing, and pointing the spray at an angle of approximately 11° from the vertical, toward the center of the dryer.

Using this set-up, and a feed liquor designed to produce sodium tripolyphosphate, the following results were obtained in a set of six runs:

TABLE 3

[Physical and chemical analysis of mixed-flow samples]

| Steam rate, lbs./hr. | 2,200 | 2,200 | 2,200 | 1,800 | 1,800 | 1,800 |
|---|---|---|---|---|---|---|
| Feed rate, g.p.m. | 60 | 60 | 65 | 65 | 55 | 60 |
| Ratio, steam flow/g.p.m. | 36 | 36 | 33 | 22 | 32 | 30 |
| Off gas temperature, °C | 380 | 380 | 390 | 390 | 390 | 390 |
| pH, 1% solution | | | 10.20 | 9.97 | 10.10 | |
| Assay, percent: | | | | | | |
| Orthophosphate | | 0.1 | 0.0 | 0.0 | | |
| Pyrophosphate | | 4.4 | 7.2 | 4.4 | | |
| Tripolyphosphate | | 95.5 | 92.6 | 95.5 | | |
| Metaphosphate | | 0.1 | 0.2 | 0.1 | | |
| Bulk density, gm./cc | 0.776 | 0.736 | 0.734 | 0.704 | 0.720 | 0.70 |

|  | Percent | | | | | |
|---|---|---|---|---|---|---|
| Screen size: | | | | | | |
| 10 mesh | 0.2 | 0.0 | 0.2 | 0.1 | 1.2 | 0.0 |
| 14 mesh | 0.3 | 0.2 | 0.6 | 0.2 | 2.2 | 0.1 |
| 20 mesh | 1.2 | 1.2 | 3.1 | 7.2 | 7.2 | 3.0 |
| 28 mesh | 5.4 | 3.8 | 10.2 | 22.0 | 16.4 | 12.8 |
| 48 mesh | 29.6 | 23.8 | 37.3 | 57.3 | 40.6 | 49.7 |
| 80 mesh | 65.6 | 59.4 | 63.9 | 77.7 | 62.2 | 67.7 |
| 100 mesh | 74.6 | 70.0 | 71.5 | 82.3 | 69.0 | 73.6 |
| Granular yield | 65 | 59 | 63 | 77 | 62 | 67 |

Similar results are obtained in producing other condensed phosphates, such as sodium and potassium pyrophosphate, which are produced simply by feeding the appropriate ratios of $P_2O_5$ and alkali-metal oxide, in solution, to the spray dryer.

Obviously, these examples can be multiplied indefinitely without departing from the scope of the invention as defined in the claims.

What is claimed is:

1. In the method of producing alkali-metal polyphosphates from aqueous solutions of $P_2O_5$ and alkali-metal oxide in proportions to produce the desired polyphosphate, and in which the solutions are sprayed into a drying zone in which a hot gas stream drives off the water to produce particles of dry alkali-metal polyphosphate, the improvements which comprise atomizing the solution upwardly from near the bottom of the drying zone against the downwardly directed hot gas stream at a velocity sufficient to push the particles upward toward the zone of entry of the hot gas stream adjacent the top of the drying zone, so that the particles approach terminal velocity in the entry zone, and fall downward with the gases from that zone, to be collected below the entry point of the solution.

2. The method of claim 1, in which the alkali-metal polyphosphate is sodium tripolyphosphate.

3. The method of claim 1, in which the hot gas stream is derived from flames directed downwardly against the spray.

4. The method of claim 1, in which a plurality of hot gas streams and a plurality of spray streams are used.

* * * * *